Figure 1:
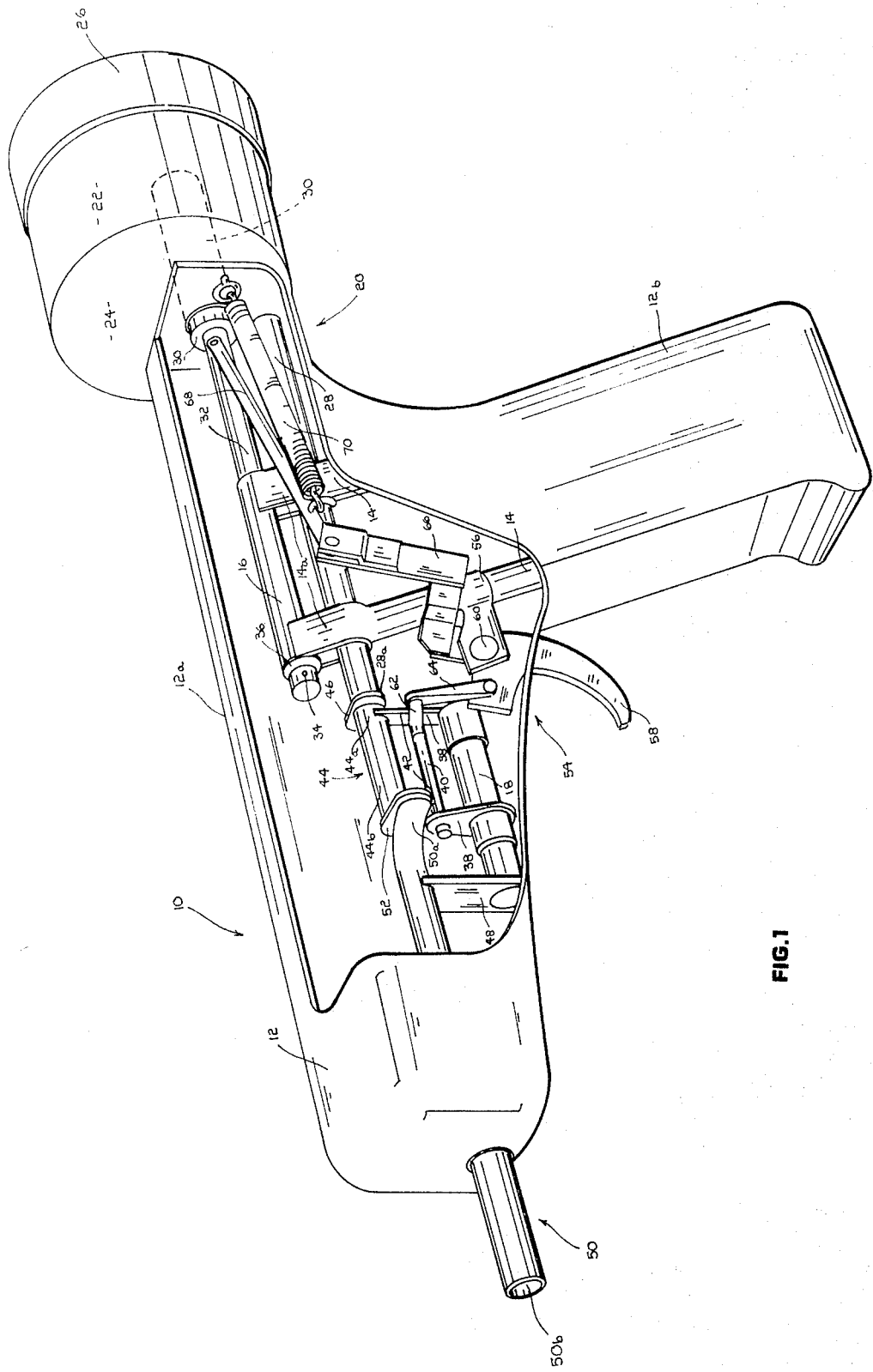

United States Patent [19]

Hamme

[11] 3,831,810
[45] Aug. 27, 1974

[54] BEARING DISPENSER

[76] Inventor: Lee F. Hamme, Rt. 2, Warrenton, N.C. 27589

[22] Filed: Sept. 11, 1972

[21] Appl. No.: 287,783

[52] U.S. Cl.................. 221/301, 221/202, 221/296
[51] Int. Cl............................................. B65h 3/30
[58] Field of Search........... 221/238, 270, 272, 274, 221/276, 281, 200, 201, 202, 171, 24, 296, 268, 269, 277, 301, 203

[56] References Cited
UNITED STATES PATENTS

| 497,059 | 5/1893 | Ramey | 221/24 |
| 559,534 | 5/1896 | Lohshand | 221/201 |
| 862,923 | 8/1907 | Linsley | 221/296 |
| 3,016,166 | 1/1962 | Furst | 221/200 |
| 3,410,452 | 11/1968 | Igel et al. | 221/200 |

FOREIGN PATENTS OR APPLICATIONS

| 199,979 | 11/1965 | Sweden | 221/268 |

Primary Examiner—Allen N. Knowles
Assistant Examiner—H. Grant Skaggs, Jr.
Attorney, Agent, or Firm—Mills and Coats

[57] ABSTRACT

In abstract, the present invention relates to a ball bearing dispenser comprising a gun type frame structure; a bearing storage chamber mounted on said frame structure; a metering chamber disposed adjacent said storage chamber and adapted to receive bearings therefrom; a dispensing chamber projecting generally forwardly from said metering chamber and adapted to receive a select quantity of bearings therefrom; and an actuating trigger assembly normally set to allow the metering chamber to be filled with a select quantity of bearings from said storage chamber and operative upon actuation to release the select quantity of bearings contained in said metering chamber.

2 Claims, 5 Drawing Figures

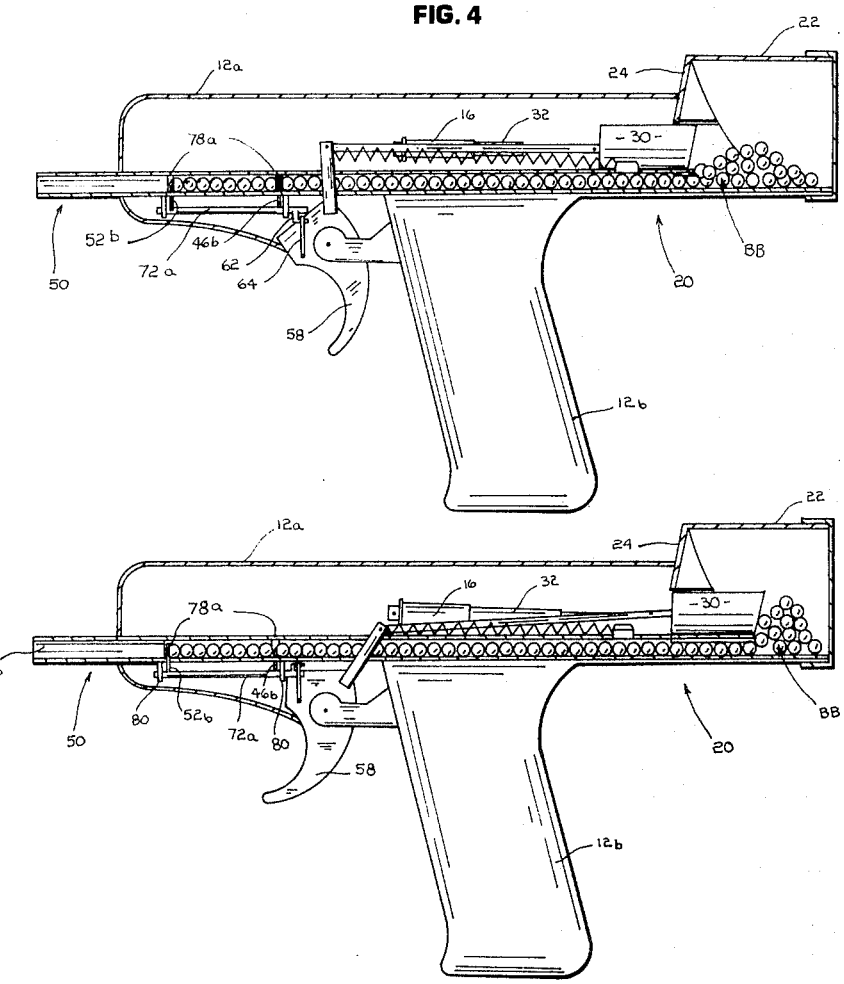

3,831,810

BEARING DISPENSER

The present invention relates to dispensers and more particularly to portable bearing dispensers of the type adapted to repeatedly dispense a preselective quantity of ball bearings or the like.

Installing ball bearings in wheels has always been a tedious and time consuming job. This is especially true where the ball bearings being installed are quite small such as the type commonly utilized in roller skate wheels. Much of the difficulty in installing these very small ball bearings lies in the inability of a worker to quickly and efficiently gather a certain quantity of bearings and insert the quantity in the bearing race.

Heretobefore, a hand scoop or tray-like container has perhaps been the most common device used to gather small ball bearings from a bin or other storage facility and insert them into the bearing race. With such a hand type scoop or tray it has, nevertheless, been difficult to gather a select quantity of bearings time after time with an appreciable degree of regularity. Moreover, in handling the scoop or tray between the bin or storage facility and the bearing race, there has been a tendency for the bearings contained therein to spill out. Thus, while the scoop or tray has been useful, it has not been a very efficient means for installing ball bearings.

After much research and study into the above mentioned problems, the present invention has been devised to provide a portable handgun type bearing dispenser that is particularly adapted to dispense a select quantity of bearings time after time with an appreciable degree of reliability and regularity. In particular, the present disclosure includes a series of species for a ball bearing dispensing apparatus, with each species basically comprising a storage chamber mounted on a handgun type frame and including a metering chamber disposed adjacent to said storage chamber and adapted to receive a select quantity of bearings therefrom. The gun type bearing dispenser is provided with a pair of spaced apart stop means for selectively controlling the movement of bearings from said storage chamber into said metering chamber and the movement therefrom. A trigger assembly is operatively connected to said pair of stop means for actuating the same and consequently initiating the dispensing action of the bearing dispenser of the present invention.

It is, therefore, an object of the present invention to provide a bearing dispenser that will dispense select quantity of bearings time after time with a substantial degree of regularity.

A further object of the present invention is to provide a portable hand actuating bearing dispenser that can be conveniently carried and used at various locations.

Another object of the present lies in the provision of a gun type bearing dispenser that is particularly to dispense a select quantity of bearings directly into a bearing race, thereby not requiring hand insertion and manipulation of the indivdual bearings during the installation operation.

A further object of the present invention is to provide a bearing dispenser that includes a series of chambers disposed on a frame structure, the series of chambers including a storage chamber and a metering chamber disposed adjacent thereto and adapted to receive bearings therefrom; an actuating means for isolating a select quantity of bearings in said metering chamber whereby the actuation of said actuating means is operative to release and consequently dispense the bearings isolated therein.

Still a further object of the present invention is to provide a simple, reliable and relatively inexpensive hand actuated bearing dispenser that is easy to construct and manufacture, but yet is reliable and efficient in operation.

A further object of the present invention is to provide a bearing dispenser that is particularly designed to dispense bearings therefrom without the individual bearings accumulating and clogging up the various passageways of the dispensing apparatus.

Other objects and advantages of the present invention will become apparent and obvious from a study of the following description and the accompanying drawings which are merely illustrative of the present invention.

IN THE DRAWINGS

Figure 2:
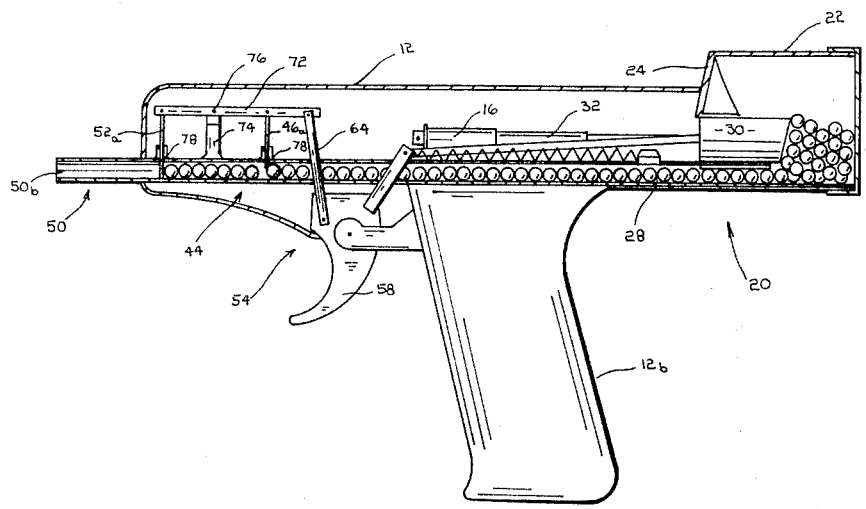
Figure 3:
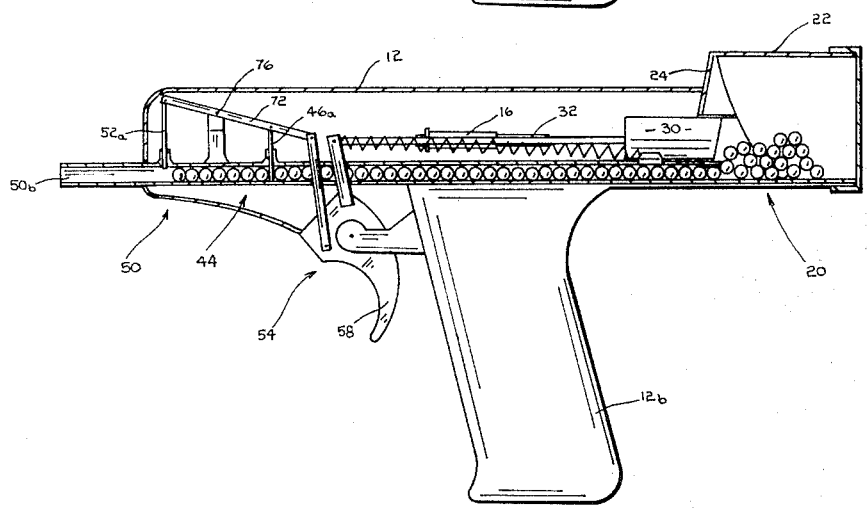

FIG. 1 is a perspective view of a first species of the ball bearing dispenser of the present invention;

FIGS. 2 and 3 are side elevational views of a second species of the ball bearing dispenser of the present invention with elect portions of the dispenser being cutaway to better illustrate the internal structure thereof, and wherein FIG. 2 depicts the dispenser in the normal nonactuated mode while FIG. 3 illustrates the dispenser in the actuated dispensing mode; and FIGS. 4 and 5 are side elevational views of a third species of the present bearing dispenser with portions cutaway to better illustrate the internal structure thereof, and wherein FIG. 5 depicts the bearing dispenser in the normal nonactuated mode while FIG. 4 depicts the bearing dispenser in the actuated dispensing mode.

With further reference to the drawings, particularly FIG. 1 which illustrates the first of three species disclosed herein, a portable gun type bearing dispenser is shown therein and indicated generally by the numeral 10. Bearing dispenser 10 generally comprises a housing 12 supported by an interframe structure to be subsequently described in detail. The housing 12 includes a generally fore-and-aft extending upper portion 12a and a hand gripping portion 12b extending generally downwardly therefrom.

Housing 12 is generally supported by an interframe structure comprising a pair of main upright support legs 14 that extend in general parallel relationship within the hand gripping portion 12b of the housing. The upper portions of the support legs 14 include bifurcated ends 14a that have connected therebetween a generally longitudinal hollow upper sleeve 16. The interframe structure further comprises a longitudinal support 18 that is fixed to the sides of the support legs 14 about intermediate portions thereof and projects generally forwardly therefrom.

Disposed about the rear of said bearing dispenser 10 is a storage chamber indicated generally by the numeral 20, the storage chamber functioning primarily to contain and store ball bearings therein as particularly illustrated in FIGS. 2-5 (the ball bearings being indicated by the letters BB).

Viewing the storage chamber 20 in detail, it is observed from FIG. 1 that the storage chamber basically comprises a generally cylindrical side wall structure 22 projecting rearwardly from an end plate 24. An end cap 26 is adapted to frictionally fit around the rear portions of the side wall structure 22 and is provided with a cutout (not shown) about the edge thereof which cooperates with a tiny locking stud (not shown) that projects outwardly from the side wall structure 22 to assure that the end cap does not inadvertently separate from the storage chamber 20. Projecting forwarding from a lower forward of the end plate 24 is an exiting tube 28 that includes a forward outlet end 28a. The exiting tube 28 is communicatively secured to the end plate 24 by a solder or other suitable means such that bearings contained within the chamber may pass therefrom into the exiting tube 28 under the influence of gravity.

To assure that the individual bearings contained in the cylindrical wall structure 22 of the storage chamber 20 do not accumulate and clog the passageway into the exiting tube 28, a plunger 30 is reciprocally mounted within storage chamber 20 such that a portion thereof extends through an opening formed within the end plate 24 rearwardly into the area of the storage chamber defined by the cylindrical wall structure 22 and the end plate 24. A plunger drive shaft 32 is connected to the plunger 30 and projects forwardly therefrom where a portion thereof is contained in sleeve 16. The forward portion of the plunger drive shaft 32 is provided with a stop 34 and a washer 36 that is circumfentially disposed about the plunger drive shaft 32 between the stop 34 and the bifurcated end 14a of the forwardmost support leg 14. It is obvious that the combined effect of the stop 34 and washer 36 is to limit the stroke of the plunger 30.

Secured to an intermediate section of the longitudinal frame support 18 and extending generally upwardly therefrom in spaced apart relationship is a pair of arms 38. Arms 38 have corresponding openings therein for rotatively receiving a rock shaft 40 which includes a pair of spaced apart carrier arms 42 that carry a metering chamber 44. The metering chamber 44 is normally disclosed in co-axial relationship with the exiting tube 28 such that bearings contained in the latter may gravitate into the former. The metering chamber 44, as shown in FIG. 1, includes an inlet end or area 44a and an outlet end or area 44b.

To prevent the movement of ball bearings from the exiting tube 28 into the inlet end 44a of the metering chamber 44 when the latter is pivoted to an offset position relative to the former, a first stop means is provided in the form of an outward flange 46 that extends generally outwardly from the inlet end 44a of the metering chamber. Thus, it can be seen by pivoting the rock shaft 40 the metering chamber 44 is positioned in an offset relationship with respect to the exiting tube 28 of the storage chamber 20. When pivoted to such an offset relationship, the outwardly directed flange 46 is operative to cover the outlet end 28a of the exiting tube 28, thereby preventing ball bearings contained therein from gravitating outwardly therefrom.

Fixed to the forwardmost end of the longitudinal support 18 is an end support 48 that supports a dispensing chamber 50, the dispensing chamber 50 including an inlet end 50a disposed adjacent the outlet end 44b of metering chamber 44 and an outlet end 50b. As particularly seen in FIG. 1, the inlet end 50a of the dispensing chamber is offset with respect to the normal position of the metering chamber 44. To normally prevent bearings from moving from metering chamber 44, a second stop means is provided in the form of an outwardly directed flange 52 that extends from the inlet end 50c of the dispensing chamber and normally covers the outlet end 44b of the metering chamber.

It is, therefore, obvious that the first stop means 46 normally assumes an open position, meaning that bearings contained in the exiting tube 28 may gravitate into the metering chamber 44. In contrast, the second stop means 52 normally assumes a closed position as the bearings contained in metering chamber 44 are blocked from moving therefrom.

To actuate the bearing dispenser 10 of the species shown in FIG. 1, the metering chamber 44 is pivoted from the normal position, where the inlet end thereof aligns with the outlet end 28a of the exiting tube, to a position where the outlet end 44b aligns with the inlet end 50a of the dispensing chamber. It is seen that the pivoting of the metering chamber 44 is effective to actuate the first and second stop means 46 and 52, respectively, since such pivotable movement results in the first stop means 46 being positioned to block the outlet end 28a of the exiting tube 28 and the second stop 52 remaining stationary as the outlet end 44b of the metering chamber 44 becomes open to the inlet end 50a of dispensing chamber 50.

To pivot the metering chamber 44 and consequently actuate the bearing dispenser 10 shown in FIG. 1, a hand actuating means, indicated generally by the numeral 54, is operatively connected thereto and operative to position the metering chamber between a normal position (shown in FIG. 1) and a dispensing position in which the outlet end 44b of the metering chamber 44 is aligned with the inlet end 50a of the dispensing chamber 50.

In particularly, the actuating means 54 is in the form of a trigger assembly and comprises a trigger mount 56 fixedly secured to the forwardmost support leg 14. A trigger 58 is pivotably mounted by a pivot pin 60 to the trigger mount 56. Pivotably connected to the trigger 58 is connecting link 64 which extends generally upwardly therefrom where an upper portion thereof is pivotably connected to a crank arm 62 which is fixed to and extends from rock shaft 40.

The trigger assembly of the actuating means 54 is further operative to drive the plunger 30 during the operation of the bearing dispenser 10. In this regard, an L-shaped plunger actuating arm 66 is fixed to and carried by the trigger 58 and has one end thereof pivotably connected to a connecting rod 68 which in turn is pivotably connected to the plunger drive shaft 32. The trigger 58 is normally biased to assume a nonoperative position (FIG. 1) by a tension spring 70 that is interconnected between the dispenser housing 12 and the plunger drive just described.

Before operation, ball bearings are placed in the rear container portion of the storage chamber 20. Subsequent to actuating the bearing dispenser 10 of FIG. 1, the outlet end 50b of the dispensing chamber 50 may be positioned adjacent the bearing race to be filled and the rear portion of the bearing dispenser is slightly elevated with respect to the outlet end 50b such that the ball bearings contained within chamber 20 tend to gravitate from the rear portion thereof, through the exiting tube 28, and on into the metering chamber 44.

The diameter of the exiting tube 28 and the metering chamber 44 is just slightly greater than the diameter of the bearings being dispensed, thereby assuring that the bearings in the two chambers remain in single file relationship. It follows that the length of metering chamber 44 determines the selected capacity thereof. Once the chamber 44 is completely full, it further follows also that bearings will be backed up in the exiting tube 28 of the storage chamber 20.

To dispense the selected quantity of bearings contained in the metering chamber 44, the trigger 58 is squeezed toward the hand grip portion 12b of the outer housing 12. The squeezing of the trigger 58 results in the metering chamber being pivoted toward the inlet end 50a of the dispensing chamber 50. It is seen that as the metering chamber so pivots the first stop means 46 covers the outlet end 28a of the exiting tube 28, thereby preventing bearings backed up therein from moving therefrom. Also, as the metering chamber 44 continues to pivot the outlet end 44b thereof tends to move away from the second stop means 52 and when the trigger 58 is completely pulled, the metering chamber has moved to a position where the outlet end thereof aligns with the inlet end 50a of the dispensing chamber 50. The alignment of the metering chamber 44 with the dispensing chamber 50 results in the select quantity of bearings contained in the former being dispensed out the latter into the bearing race under the influence of gravity.

Once the trigger 58 is released, the tension springs 70 biases the trigger back to its normal position, as shown in FIG. 1. As the trigger 58 returns to its normal position it follows that the metering chamber 44 also returns to its normal position and in the process the second stop means 56 then becomes effective to cover or block the outlet end 44b thereof. Also, in the normal position, the first stop means 46 is no longer operative to cover the outlet end 28a of the exiting tube 28, as the inlet end 44a of the metering chamber 44 is now aligned with the exiting tube such that the bearings may pass therefrom into the metering chamber. After the select quantity of bearings fill the metering chamber 44, the bearing dispenser is now ready for actuation once again.

Turning to FIGS. 2 and 3, a second species of the bearing dispenser 10 is shown therein. Although the second species shown herein operates and functions on the same basic principles and concepts as the first species, there is, nevertheless, some structural differences. In this regard, it will be observed from studying the drawings that the metering chamber 44 is integrally constructed with the exiting tube 28 and the dispensing chamber 50, all three being in longitudinal alignment whereby the bearings may pass therethrough in a general straight line.

In addition, the actuating means 54 of the second species shown in FIGS. 2 and 3, comprises a rocker member 72 pivotably mounted about axis 76 to an upright support 74 extending upwardly from the metering chamber 44. It is noted that axis 76 extends generally perpendicular to the axis of said metering chamber 44. Also, it is seen that the first and second stop means 46a and 52a, respectively, are now pivotably mounted to opposite ends of the rocker members 72 and depend generally downwardly therefrom where lower portions thereof are operative to extend through openings 78 formed in the metering chamber 44.

To actuate the bearing dispenser 10 of the second species, the connecting link 64 is connected directly to the trigger 58 and the squeezing of the trigger results in the rocker member 72 being pivoted about axis 76.

In particular, the squeezing of the trigger 58 results in the second stop means 52a being lifted to a raised position and the fist stop means 46a being lowered to a closed position, as shown in FIG. 3. In this position, the select quantity of bearings contained in the metering chamber 44 are free to move therefrom out the dispensing chamber 50. Upon releasing the trigger 58, the tension of spring 70 causes the actuating means to assume the position shown in FIG. 2. This allows bearings to move from the exiting tube 28 into the metering chamber 44 where the bearings contained therein are prevented from moving therefrom by the presence of second stop means 52a.

Now, turning to a third species shown in FIGS. 4 and 5, it is seen that the rocker member is in the form of a rock shaft 72a that is particularly rotatively supported by a pair of spaced apart arms 80 depending downwardly in spaced apart relationship below the metering chamber 44. It will be observed that the longitudinal axis of the rock shaft 72a extends in general parallel relationship with the axis of the dispensing and metering chambers 50 and 44, respectively.

In the third species, the first and second stop means is in the form of a pair of hook shaped stops 46b and 52b. The hook shaped stops 46b and 52b are disposed in axially spaced apart relationship and are phased approximately 180 degrees apart. Metering chamber 44 is provided with a narrow side openings 78a to accommodate each of the hook shaped stops such that upon actuation of the rock shaft 72a by the trigger 58 each of the hook shaped stops may readily pass to and from within the chamber 44. As in the two preceding species discussed, the two hook shaped stops function to isolate a select quantity of bearings in the metering chamber 44, and upon actuation of the bearing dispenser the first and second stop means 46b and 52b are operative to release the isolated predetermined quantity from the metering chamber and present bearings from the storage chamber 20 from moving through and being dispensed with the quantity of previously held in the metering chamber.

With particular reference to the operation of the third species, it will be observed that normally the first stop 46b is disposed outwardly of the metering chamber 44 while the first stop 52b extends through a forward portion thereof and prevents the bearings contained therein from being inadvertently dispensed (FIG. 5). Upon squeezing of the trigger 58, the second stop 52b is pulled from the chamber 44 as simultaneously the first stop 46b is caused to project through the chamber which has the result of allowing the isolated quantity of bearings in chamber 44 to be dispensed therefrom through dispensing chamber 50 while the bearings contained in the exiting tube 28 are prevented from moving therefrom.

In view of the above, it is obvious that the bearing dispenser 10 of the present invention presents a new and useful ball bearing dispensing apparatus that is operative to dispense a select quantity of bearings time after time with an appreciable degree of reliability and regularity. In addition, the particular design of the present bearing dispenser is simple and easy to construct and can be manufactured in such a manner that the total cost of the apparatus would be reatlively inexpensive. Moreover, it is obvious that the present invention is portable and can be used at various locations.

The terms "upper", "lower", "forward", "rearward", etc., have been used herein merely for the convenience of the foregoing specification and in the appended claims to describe the bearing dispenser and its parts as oriented in the drawings. It is to be understood, however, that these terms are in no way limiting to the invention since the bearing dispenser may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A portable hand held gun type bearing dispenser comprising: a portable frame structure including a hand gripping means for allowing the bearing dispenser to be held within the hand of the user and to be moved from one location to another; a bearing storage chamber mounted on said frame structure and including a main cylindrical storage unit and an exiting tube projecting forwardly from said main cylindrical storage unit, said exiting tube having an outlet end and of less diameter than said main cylindrical storage unit but being slightly greater in diameter than the bearings contained within said main cylindrical storage unit; a separate cylindrical metering tube having opposite inlet and outlet ends with said inlet end being adjacent the outlet end of said exiting tube; means for pivotably mounting said cylindrical metering tube about an axis extending generally parallel to the axis of said exiting tube such that said metering tube may be moved between a position of alignment with said exiting tube and an offset position relative to said exiting tube; a first stop flange means fixed to the inlet end of said metering tube and projecting radially therefrom for blocking the outlet end of said exiting tube when said metering tube is positioned in said offset position; a fixed cylindrical dispensing tube projecting generally forwardly from said metering and exiting tube and including an inlet end offset relative to said exiting tube such that said inlet end of said dispensing tube aligns with said outlet end of said metering tube when said metering tube assumes said offset position; a second stop flange means fixed to the inlet end of said dispensing tube and projecting radially therefrom for blocking the outlet end of said metering tube when said metering tube assumes the aligned position with said exiting tube; a trigger assembly mounted to said frame structure forwardly of said hand gripping means; and means operatively interconnected between said trigger and said means for pivotably mounting said metering tube for moving said metering tube between said aligned position with said exiting tube and said offset position whereby each actuation of said trigger results in a predetermined quantity of bearings being dispensed through that dispensing tube.

2. The bearing dispenser of claim 1 wherein said bearing dispenser further includes a plunger reciprocally mounted within said main cylindrical storage unit and means interconnecting said trigger with said plunger for actuating said plunger simultaneously with the activation of said metering tube, whereby bearings within said main cylindrical storage unit are agitated on each occasion that bearings are dispensed.

* * * * *